United States Patent
Shin et al.

(10) Patent No.: US 8,988,353 B2
(45) Date of Patent: Mar. 24, 2015

(54) MOBILE DEVICE AND METHOD FOR EDITING PAGES USED FOR A HOME SCREEN

(75) Inventors: Seung Woo Shin, Seoul (KR); Bong Won Lee, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 505 days.

(21) Appl. No.: 12/774,852

(22) Filed: May 6, 2010

(65) Prior Publication Data

US 2010/0295789 A1 Nov. 25, 2010

(30) Foreign Application Priority Data

May 19, 2009 (KR) .................. 10-2009-0043412

(51) Int. Cl.
*G06F 3/02* (2006.01)
*G06F 3/048* (2013.01)
*G06F 3/0484* (2013.01)
(Continued)

(52) U.S. Cl.
CPC .......... *G06F 3/04847* (2013.01); *G06F 1/1626* (2013.01); *G06F 1/1694* (2013.01); *G06F 3/0486* (2013.01); *G06F 3/04883* (2013.01); *G06F 2200/1637* (2013.01); *G09G 5/14* (2013.01)
USPC ........... 345/168; 345/169; 345/170; 345/171; 345/172; 715/765; 715/778; 715/788; 715/806

(58) Field of Classification Search
CPC . G06F 3/033; G06F 3/04883; G06F 3/04845; G06F 3/0487; G06F 3/04808; G06F 3/0481–3/0488

USPC .......... 345/634, 659, 156–184; 715/210, 863, 715/867, 840, 765–779
See application file for complete search history.

(56) References Cited

U.S. PATENT DOCUMENTS 7,954,064 B2 * 5/2011 Forstall et al. ................ 715/779
2005/0237573 A1 10/2005 Tomita et al.
(Continued)

FOREIGN PATENT DOCUMENTS

CN 101123775 A 2/2008
CN 101178615 A 5/2008
(Continued)

OTHER PUBLICATIONS

"Macworld 2008 special features of iPod Touch, an evolution of the best Wi-Fi device with 9 new features," Mac Fan, No. Mar. 2008 (vol. 16, No. 3, Serial No. 299), Maeil Communications Inc., Mar. 1, 2008, pp. 28-29.

(Continued)

*Primary Examiner* — Prabodh M Dharia
(74) *Attorney, Agent, or Firm* — Cha & Reiter, LLC (57) ABSTRACT

Provided are a method and related mobile device for editing, in an integrated, convenient and quick manner, various menu pages selectively used for a home screen. In response to a given input signal, the mobile device outputs a page edit screen including a specific page displayed on the home screen. Then, in response to subsequent input signals, the mobile device may add a new page, delete a selected page, change a title of a selected page, move or remove a selected icon in a page, change a background image of a selected page, or change a positional order of pages.

18 Claims, 8 Drawing Sheets

(51) Int. Cl.
*G06F 1/16* (2006.01)
*G06F 3/0486* (2013.01)
*G06F 3/0488* (2013.01)
*G09G 5/14* (2006.01)

(56) References Cited

U.S. PATENT DOCUMENTS

| | | | |
|---|---|---|---|
| 2007/0101297 | A1 | 5/2007 | Forstall et al. |
| 2007/0157089 | A1* | 7/2007 | Van Os et al. ............ 715/702 |
| 2007/0216965 | A1 | 9/2007 | Yoshihama |
| 2007/0296738 | A1* | 12/2007 | Louch et al. ............ 345/634 |
| 2008/0040680 | A1 | 2/2008 | Lee |
| 2008/0155481 | A1* | 6/2008 | Kim et al. .............. 715/867 |
| 2009/0178008 | A1* | 7/2009 | Herz et al. ............. 715/840 |
| 2009/0228842 | A1* | 9/2009 | Westerman et al. ....... 715/863 |
| 2009/0244099 | A1* | 10/2009 | Valalik et al. ............ 345/659 |
| 2009/0327850 | A1* | 12/2009 | Obrecht et al. .......... 715/210 |
| 2010/0138764 | A1* | 6/2010 | Hatambeiki et al. ...... 715/765 |

FOREIGN PATENT DOCUMENTS

| | | | |
|---|---|---|---|
| EP | 1 928 160 A2 | 6/2008 | |
| JP | 11-282694 A | 10/1999 | |
| JP | 2005-311478 A | 11/2005 | |
| JP | 2007-249863 A | 9/2007 | |
| JP | 2008-176641 A | 7/2008 | |
| KR | 10-0747663 | * 8/2007 | ............ H04B 1/40 |
| KR | 10-0861656 | 9/2008 | ............ H04B 1/40 |
| KR | 10-0869950 | 11/2008 | ............ H04B 1/40 |
| KR | 10-0880126 | 1/2009 | ............ H04B 1/40 |

OTHER PUBLICATIONS

"Arrival of 'Android Market' Google Mobile Phones," (NE) Nikkei Electronics, No. Sep. 8, 2008 (No. 986), Nikkei BP, Sep. 8, 2008, pp. 52-55, ISSN: 0910-7215.

"Technology for creating business: platform. Fourth ACCESS Linux Platform (2nd)," Nikkei Communication, No. Nov. 15, 2008 (No. 522), Nikkei BP, Nov. 15, 2008, pp. 52-55, ISSN-0910-7215.

Yamane, Yasuhiro; "Whole Nokia E61," first edition, Sep. 10, 2007, Technology Critic Inc., No. 8-13, pp. 24-25, ISBN: 978-4-7741-3179-5.

Kentaro Tadashi, et al.; Feynman Inc., "iPhone Web Style," first edition, Mar. 3, 2009, Softbank Creative Inc., pp. 21-27, ISBN: 978-4-7973-5138-5.

Yamaoka Toshiki, "Design and evaluation of structural user interface," first edition, Dec. 25, 2000, Public Publication Inc., pp. 80-85, ISBN: 4-320-02996-8.

JP, "Macworld 2008 special feature of iPod Touch, an evolution of the best Wi-Fi device with 9 new features," Mac Fan, No. Mar. 2008 (vol. 16, No. 3, Serial No. 299) Maeil Communications Inc., Mar. 1, 2008, pp. 28-29.

JP, "Arrival of 'Android Market' Google Mobile Phones," (NE) Nikkei Electronics, No. Sep. 8, 2008 (No. 986) Nikkei BP, Nov. 15, 2008, pp. 14-15, ISSN: 0385-1680.

JP, "Technology for creating business: platform. Fourth ACCESS Linux Platform (2nd)," Nikkei Communication, No. Nov. 15, 2008 (No. 522). Nikkei BP, Nov. 15, 2008, pp. 52-55. ISSN: 0910-7215.

JP, Yasuhiro Yamane, "Whole Nokia E61," first edition, Sep. 10, 2007, Technology Critic Inc., No. 8-13, pp. 24-25, ISBN: 978-4-7741-3179-5.

JP, Tadashi Kentaro, Kawabata Taseuku Feynman Inc., "iPhone Web Style," first edition, Mar. 3, 2009, Softbank Creative Inc., pp. 21-27, ISBN: 978-4-7973-5138-5.

JP, Toshiki Yamaoka, "Design and evaluation of structural user interface," first edition, Dec. 25, 2000, Public Publication Inc., pp. 80-85, ISBN: 4-320-02996-8.

JP, Yoko Motegi, "Business Techniques for Utilizing Acrobat+PDF 9/8/7, Corresponding to Adobe Reader9," first edition, Apr. 8, 2009, Syoeisa Co., p. 168, ISBN: 978-4-7981-1874-1.

* cited by examiner

MOBILE DEVICE AND METHOD FOR EDITING PAGES USED FOR A HOME SCREEN

CLAIM OF PRIORITY

The application claims, pursuant to 35 USC 119, priority to and the benefit of the earlier filing date of, that patent application entitled "Mobile Device and Method for Editing Pages Used for Home Screen," filed in the Korean Patent Office on May 19, 2009 and afforded serial number 10-2009-0043412, the contents of which are incorporated by reference, herein.

BACKGROUND OF THE INVENTION

1. Field of the Invention

The present invention relates to the field of mobile devices and, more particularly, to a method and related mobile device for editing various menu pages selectively used for a home screen.

2. Description of the Related Art

Nowadays, a mobile devices support a great variety of user-friendly functions to meet customer's increasing demands. Such mobile devices have come to be used widely owing to their convenience in use and good portability.

Generally a mobile device has a home screen which is initially displayed on a display unit when the mobile device initializes respective organizing elements after booted. A traditional home screen is a specific page which contains some menu items and other features, selected and disposed by a manufacturer, and which is outputted as default screen. Namely, this configuration of a home screen does not meet user's needs sufficiently, and, hence, users mostly understand that a home screen is merely an initial screen displayed after booting or a menu selection screen for performing a desired function. So, conventional a home screen has a very low utilization.

BRIEF SUMMARY OF THE INVENTION

An aspect of the present invention is to provide a method for quickly and conveniently editing at least one menu page which is used for a home screen that has at least one menu icon or widget icon and also to provide a mobile device which allows performing the above method.

According to one aspect of the present invention, provided is a method for editing pages used for a home screen of a mobile device, the method comprising: displaying a specific page on the home screen; receiving a given input signal for a page edit; and outputting a page edit screen in response to the input signal, the page edit screen containing at least one page including the displayed specific page.

According to another aspect of the present invention, provided is a mobile device having a home screen, the mobile device comprising: a memory unit configured to store at least one page displayed on the home screen; a display unit configured to display the at least one page; an input signal creation module configured to create at least one of an input signal for outputting a page edit screen, an input signal for adding a new page, an input signal for deleting a selected page, an input signal for changing a title of a selected page, an input signal for moving or removing a selected icon in a page, an input signal for changing a background image of a selected page, and an input signal for changing a positional order of pages; and a control unit configured to receive the at least one input signal from the input signal creation module and, depending on the received input signal, to perform at least one of a function to output the page edit screen, a function to add the new page, a function to delete the selected page, a function to change the title of the selected page, a function to move or remove the selected icon in the page, a function to change the background image of the selected page, and a function to change the positional order of the pages.

Therefore, according to aspects of the present invention, it is possible to simply and easily edit pages used for a home screen of a mobile device by deleting, adding or transferring pages and icons disposed in such pages.

Other aspects, advantages, and salient features of the invention will become apparent to those skilled in the art from the following detailed description, which, taken in conjunction with the annexed drawings, discloses exemplary embodiments of the invention.

DETAILED DESCRIPTION OF THE INVENTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 1:
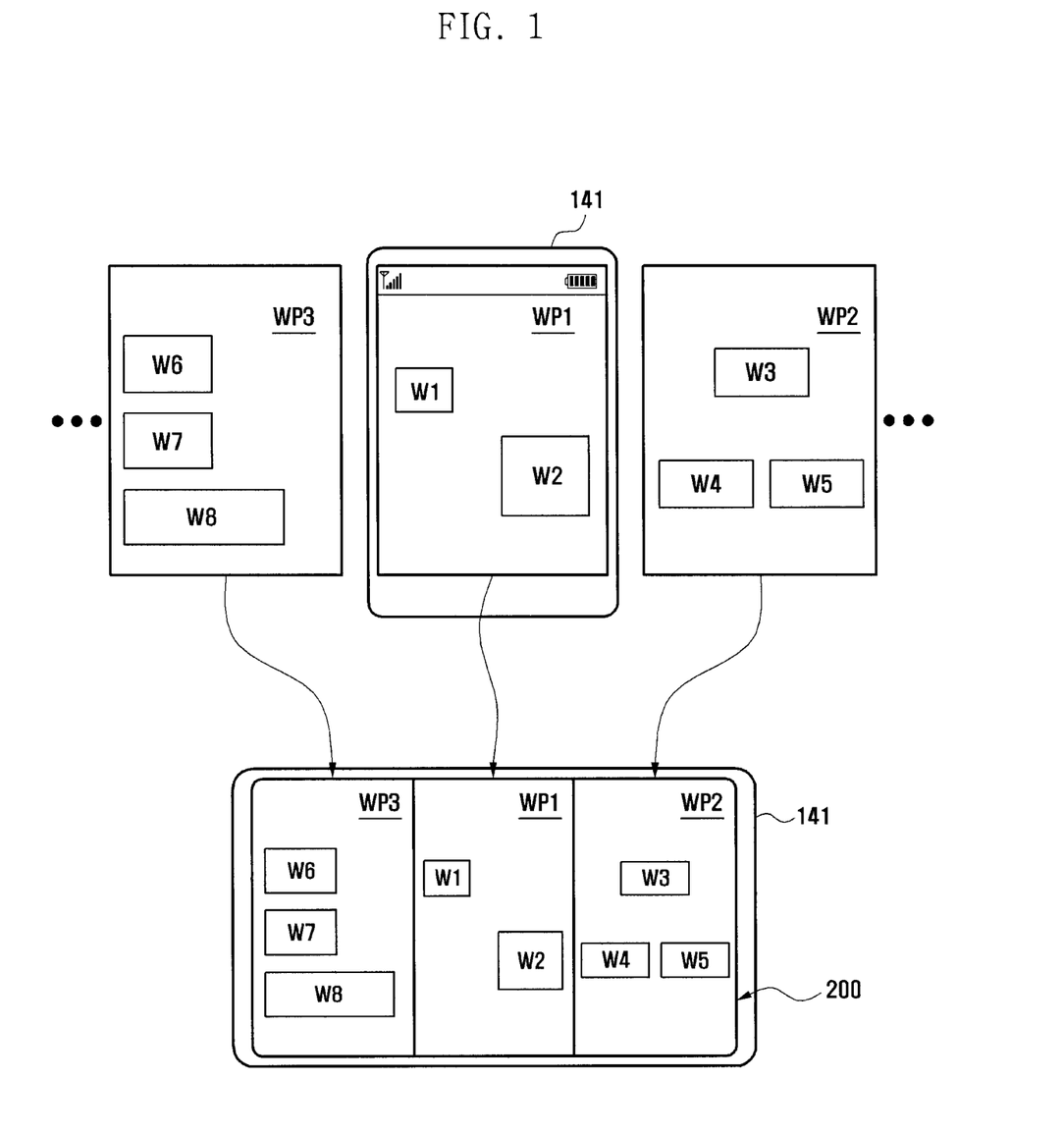
FIG. 1 is an exemplary view illustrating a process of editing a home screen for a mobile device in accordance with an exemplary embodiment of the present invention.

FIG. 1 is an exemplary view illustrating s a process of editing a home screen for a mobile device in accordance with an exemplary embodiment of the present invention.

Referring to FIG. 1, a user of a mobile device can form a home screen with at least one page, preferably a plurality of different pages, for his or her mobile device. Respective pages contain widget icons or menu icons. The mobile device may offer an icon tree organized by a number of widget icons or menu icons to be used for such home screen pages. The mobile device may also offer a menu for adding a new page or deleting a page used.

Specifically, in order to form the home screen in the mobile device, a user can create a plurality of pages, for example, the first page WP1, the second page WP2 and the third page WP3. Additionally, a user can dispose at least one widget icon in each page. For instance, the first page WP1 contains the first widget icon W1 and the second widget icon W2. Similarly, the second page WP2 contains the third, fourth and fifth widget icons W3, W4 and W5, and the third page WP3 contains the sixth, seventh and eighth widget icons W6, W7 and W8. Here, a user can also create an additional page (not shown) and then dispose additional widget icons in the not shown added page. This will be described later. Meanwhile, a user can search for these pages WP1, WP2 and WP3 by using an input unit. For a page search, the mobile device may have a key input unit allowing a navigation key input and/or a touch screen allowing a touch-based navigation input.

The mobile device can perform a page shift when receiving an input signal for a page shift through the aforementioned input unit. For instance, let's suppose that the first page WP1 is displayed on a display unit 141, as shown. In this case, if an input signal is received through a left or right navigation key, the mobile device outputs the second page WP2 or the third page WP3 instead of the first page W1 on the display unit 141, depending on an inputted navigation direction.

Meanwhile, the mobile device can provide a page edit screen 200 when receiving an input signal, such as a given touch event or a given key input signal, for instructing the edit of pages used for the home screen. In particular, the mobile device may have a certain motion sensor, such as an acceleration sensor or a gyro sensor, which generates a motion signal in response to the movement of the mobile device. Here, the mobile device can provide the page edit screen 200, based on such a motion signal. For instance, if a user turns the mobile device in a certain direction when a specific page is outputted in a lengthwise mode, the mobile device receives a motion signal generated by rotation, regards the received signal as a signal instructing the page edit, and then outputs the page edit screen 200 on the display unit 141.

In this case, the mobile device may output simultaneously two or more pages on a single screen. For instance, as shown, the mobile device outputs the first, second and third pages WP1, WP2 and WP3 together on the display unit 141 in a widthwise mode. Here, the mobile device performs a resizing of pages in order to put several pages into a single screen, and then outputs the resized pages on the display unit 141. Also, the mobile device forms the page edit screen 200 on the basis of a specific page outputted when receiving an input signal for the page edit. For instance, if the display unit 141 displays the first page WP1 when the page edit signal is inputted, the mobile device outputs the page edit screen 200 including the second and third pages WP2 and WP3 at both sides of the first page WP1.

Although in this example three pages are outputted on a single screen, this is exemplary only and not to be considered as a limitation of the present invention. Alternatively, the mobile device of the invention may output fewer or more pages such as one, two, four or five page(s) on the page edit screen. The mobile device may regulate the size of each page to concurrently display given pages and, if necessary, dispose pages in two or more rows on the screen.

As discussed, the mobile device according to an embodiment of the invention detects its own motion and therefore outputs the page edit screen 200 containing at least one page used for the home screen. Alternatively, the mobile device receives a key input signal or a given touch event signal and outputs the page edit screen 200.

Figure 2:
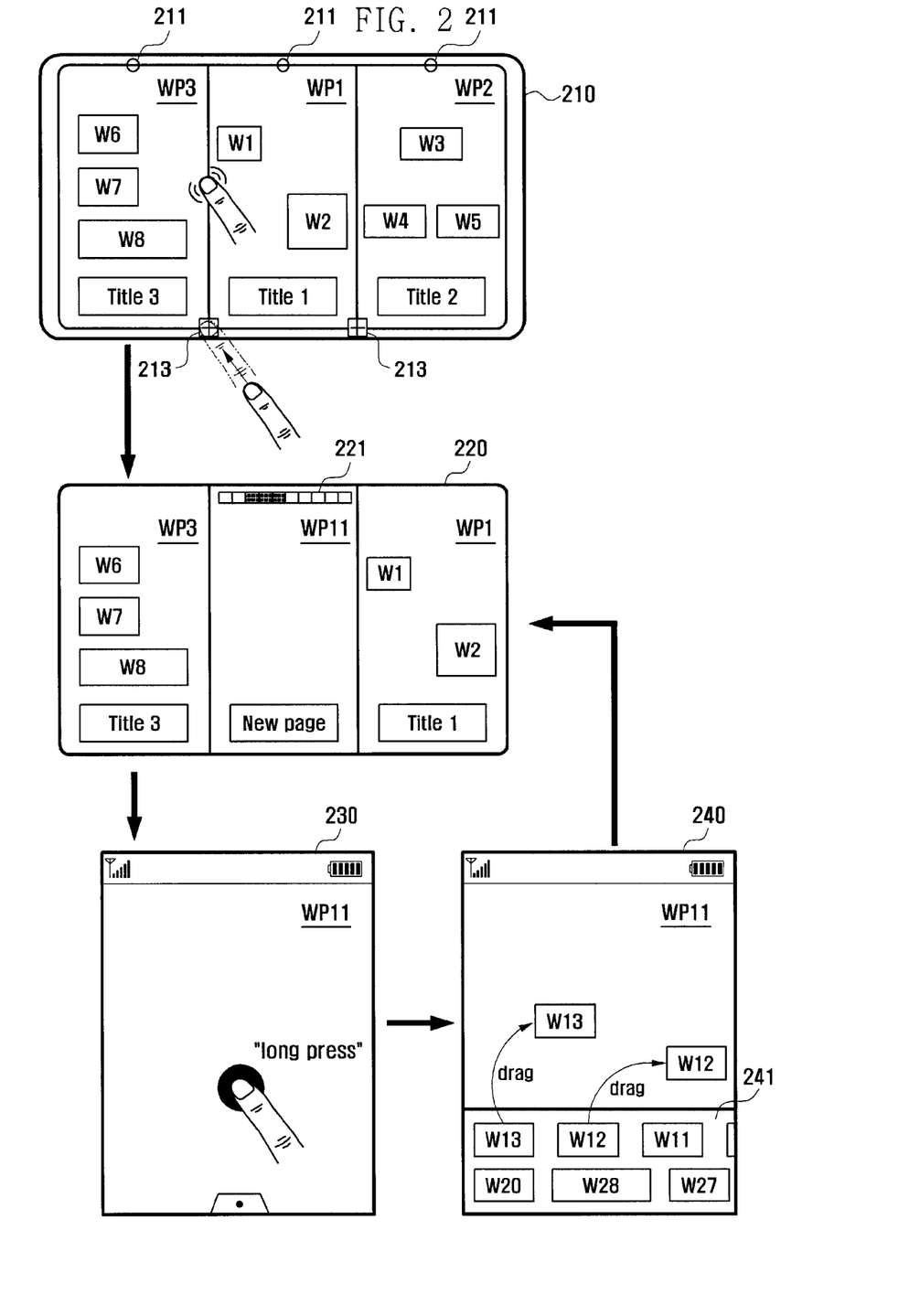
FIG. 2 is an exemplary view illustrating a process of adding a new page during the edit of a home screen for a mobile device in accordance with an exemplary embodiment of the present invention.

FIG. 2 is an exemplary view illustrating a process of adding a new page during the edit of a home screen for a mobile device in accordance with an exemplary embodiment of the present invention.

Referring to FIG. 2, when receiving an input signal, such as a motion sensing signal, a key input signal or a touch event, the mobile device outputs a plurality of pages as a page edit on a single screen as indicated by a reference number 210. This screen 210 for a page edit may include a page deletion button 211 and a page addition button 213.

Specifically, the page edit screen 210 is composed of the first, second and third pages WP1, WP2 and WP3 and may also have the page deletion button 211 at a central portion of the top of each page. When a user wants to delete a selected one of pages currently displayed on the display unit, he or she may input instructions for activating the page deletion button 211 of the selected page. When one of the page deletion buttons 211 is activated, the mobile device performs the deletion of the corresponding page where the activated button 211 is located. Additionally, the mobile device may output in advance a popup window for inquiring about a page deletion.

The page addition button 213 may be provided at a boundary of each page. Namely, as shown, the page edit screen 210 may have the page addition button 213 at a lower portion of a boundary between the third and first pages WP3 and WP1 and between the first and second pages WP1 and WP2. In order to create an input signal for adding a new page, a user can touch the page addition button 213, or alternatively can invoke a touch event at a boundary between adjacent pages. In the latter case, a touch event includes the act of rubbing such a boundary, for example.

Then, as shown in a screen indicated by a reference number 220, the mobile device creates a new page, depending on a touched button 213 or boundary. For instance, when a user activates the page addition button 213 between the first and third pages WP1 and WP3 or acts to create an equivalent input signal, the mobile device performs the addition of a new page, i.e., the eleventh page WP11 as shown, between the third and first pages WP3 and WP1. Here, a page index may be varied according to a manufacturer's intention or a user's setting.

As shown in this page edit screen 220, the mobile device may dispose the newly created eleventh page WP11 at the center of the screen between the third page WP3 located to the left and the first page WP1 located to the right. Just after the WP11 page is created, the eleventh page WP11 may be an empty page without any widget icon or the like. Additionally, a title of the newly created eleventh page WP11 may be predetermined, as default. For example, the term "New Page" may be presented or the page may be outputted as a blank page Meanwhile, the page edit screen 220 may further have a location bar 221 disposed, for example, at the top of the eleventh page WP11. The location bar 221 indicates the total number of pages and relative locations of currently displayed pages. As shown, the location bar 221 is composed of ten boxes that have the third, fourth and fifth boxes distinguished from the remaining boxes. The location bar 221, in this exemplary example of a new page, shows that ten pages are used for the home screen and that the currently displayed third, eleventh and first pages WP3, WP11 and WP1 are located at the third, fourth and fifth positions among the ten pages. The location bar 221 may be also displayed on the aforementioned screen 210. The boxes, which are indications of associated pages, of the location bar 221 are increased or decreased depending on the addition or deletion of pages.

If a user wants to see a specific page through the whole area of the page edit screen 220, the user may act to create a motion sensing signal, a key input signal or a touch event. For instance, when the page edit screen 220 is displayed in a widthwise mode, a user can turn the mobile device to a lengthwise position. Then the mobile device regards such a motion as an input signal instructing a whole view of a specific single page.

Thereafter, the mobile device outputs a single page on the entire screen as indicated by a reference number 230. Here, the mobile device may select a page centrally disposed on the page edit screen 220 for an output on the entire screen.

Additionally, the mobile device may receive an input signal for registering a new widget on the whole view screen 230. For instance, in case where the display unit is formed of a touch screen, an input signal for a widget register may be a touch event of a long press in which a touchdown event is continued for a particular length of time. If such a touch event occurs, the mobile device outputs a widget register screen 240.

The widget register screen 240 allows registering a selected widget to the newly created eleventh page WP11. For this, the mobile device offers an icon tree region 241 containing at least one widget icon on the screen. A user can select one of the widget icons contained in the icon tree region 241 and then move the selected widget icon to the eleventh page WP11 through a drag operation (or cut and paste operation). Also, a user can move any widget icon within the eleventh page WP11 through a touch and drag operation. Additionally, in order to prevent unwanted movement of a widget icon due to a mistaken touch on the eleventh page WP11, the mobile device may allow the movement of a widget icon only when the icon tree region 241 is activated.

Meanwhile, when receiving an input signal for a shift to the page edit screen, the mobile device outputs the aforesaid page edit screen 220 having an arrangement of pages.

As discussed, the mobile device according to an embodiment of the invention provides the page edit screen for adding or deleting a page used for the home screen and hence allows a quick and convenient means to edit of a page without a complicate key input. Since the page edit screen outputs several pages on a single screen, it is possible to easily check the total number of pages and also realize a simple and integrated management of all pages.

Figure 3A:
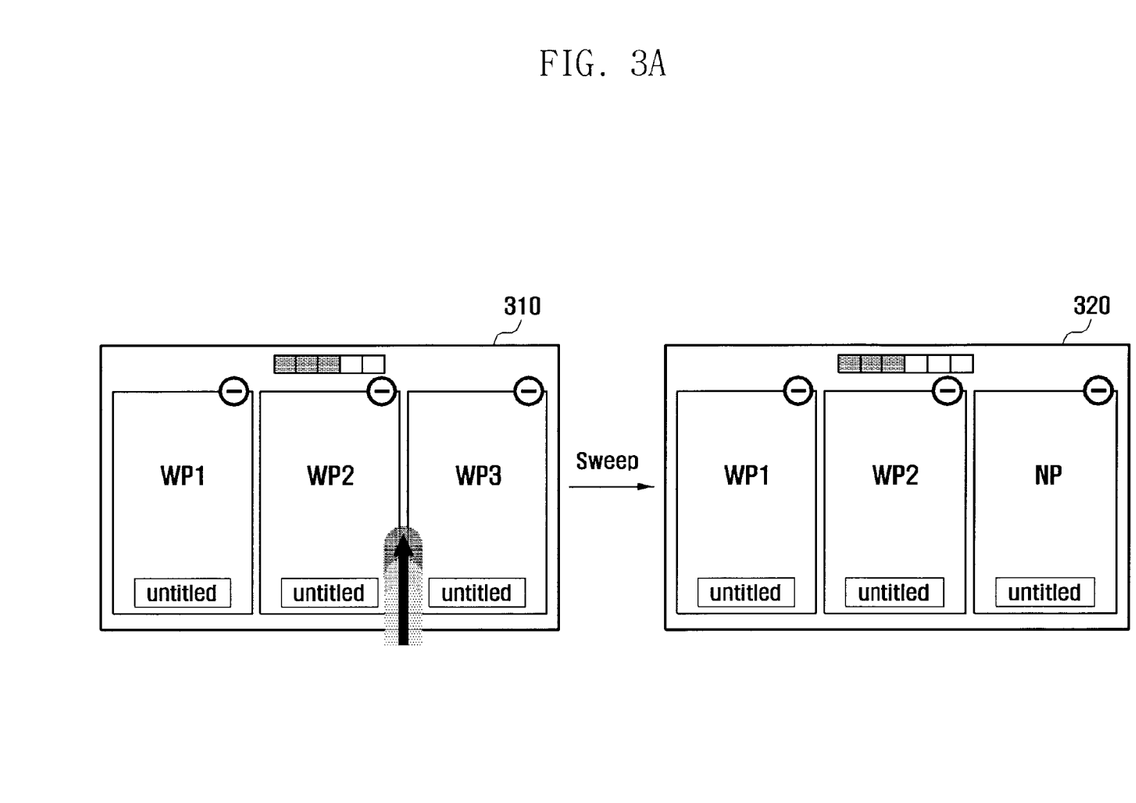
FIGS. 3A and 3B are exemplary views illustrating a process of adding or deleting a selected page during the edit of a home screen for a mobile device in accordance with another exemplary embodiment of the present invention.
Figure 3B:
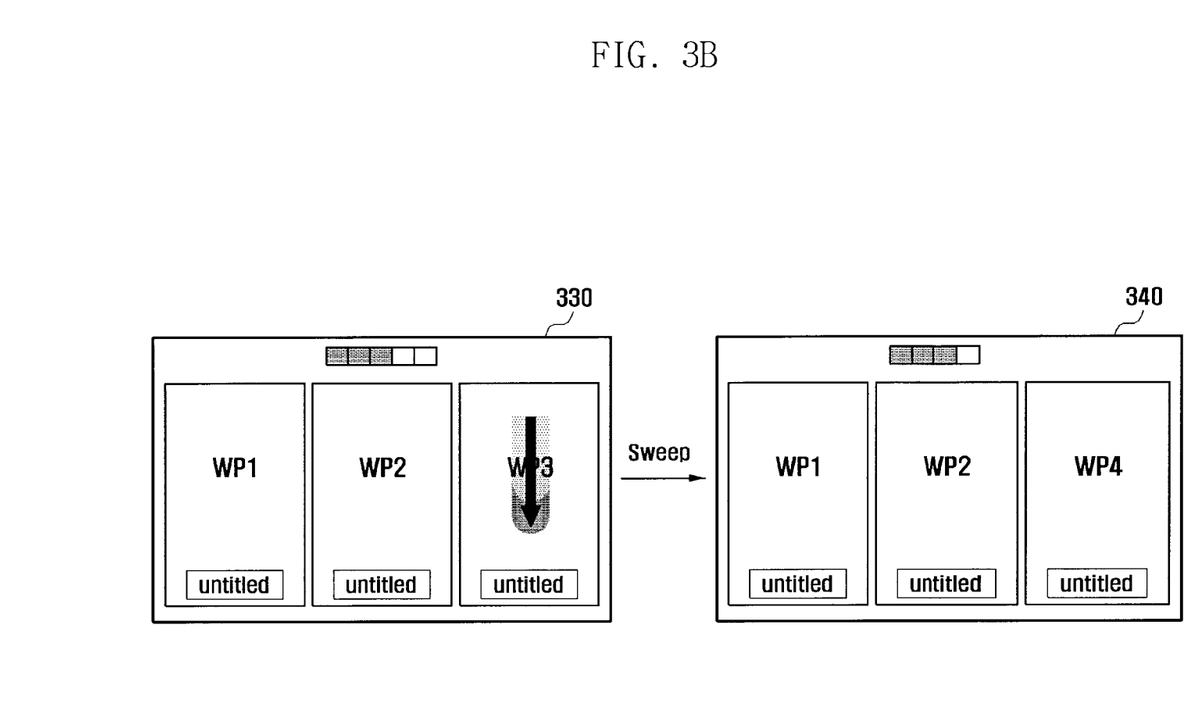

FIGS. 3A and 3B are exemplary view illustrating a process for adding or deleting a selected page during the edit of a home screen for a mobile device in accordance with another exemplary embodiment of the present invention.

Referring to FIG. 3A, the mobile device may receive a user's input for activating the page edit screen when the second page WP2 is displayed on the home screen. Then the mobile device may dispose the second page WP2 at the center of the screen, the first page WP1 to the left, and the third page WP3 to the right, as shown in a screen indicated by a reference number 310. Here, contrary to an example shown in FIG. 2, the mobile device may not display a page addition button.

When a user wants to create a new page, they can invoke a touch event at a boundary between adjacent pages. For instance, a user can make a sweeping action along a boundary which corresponds to a desired location of a new page. If a user wants to create a new page between the second and third pages WP2 and WP3, he or she sweeps their finger over the display unit in an upward direction along a boundary between the second and third pages WP2 and WP3. Then the mobile device creates and outputs a new page NP between the second and third pages WP2 and WP3, as shown in a screen indicated by a reference number 320. At this time, if only three pages are allowed to be outputted on the display unit, the mobile device removes the third page WP3 from the screen and instead outputs a new page NP. Alternatively, the mobile device may remove the first page WP1, move the second page WP2 to the left, and output the new page NP at the center.

On the other hand, the page edit screen 310 has a location bar composed of five boxes which indicate a total of five pages. After a new page NP is added, on the page edit screen 320 the location bar comes to have six boxes. Meanwhile, instead of the aforesaid upward sweep event, a user may alternatively take a sweep action in a downward direction along a boundary between the second and third pages WP2 and WP3, and the mobile device may regard a user's downward sweep event as an input for adding a new page.

Next, referring to FIG. 3B, the mobile device may receive a user's input for activating the page edit screen when the second page WP2 is displayed on the home screen. Then the mobile device may dispose the second page WP2 at the center of the screen, the first page WP1 to the left, and the third page WP3 to the right, as shown in a screen indicated by a reference number 330. Here, contrary to an example shown in FIG. 2, the mobile device may not display a page addition button.

When a user wants to delete a specific page, they can invoke an input event for deleting a desired page. For instance, a user can touch a desired page to be deleted and then take a sweep action in a particular direction. Here, such a sweep direction is any direction except directions toward other pages. Namely, in this case, a sweep direction includes an upward, downward or rightward direction.

When receiving a sweep event in a given direction on a specific page, the mobile device removes a selected page from the display unit and also deletes it from a page list. At this time, the mobile device may output a popup window for inquiring about a page deletion in order to prevent unintended deletion due to a mistaken touch. If the third page WP3 is removed, for example, from the page edit screen 330, the mobile device outputs instead the fourth page WP4 which is the next sequential page after the third page WP3.

Meanwhile, when deleting a requested page, the mobile device may also reduce boxes of a location bar displayed on the page edit screen 340. For instance, a location bar having five boxes on the page edit screen 330 comes to have four boxes on the page edit screen 340 since one page is removed.

Figure 4:
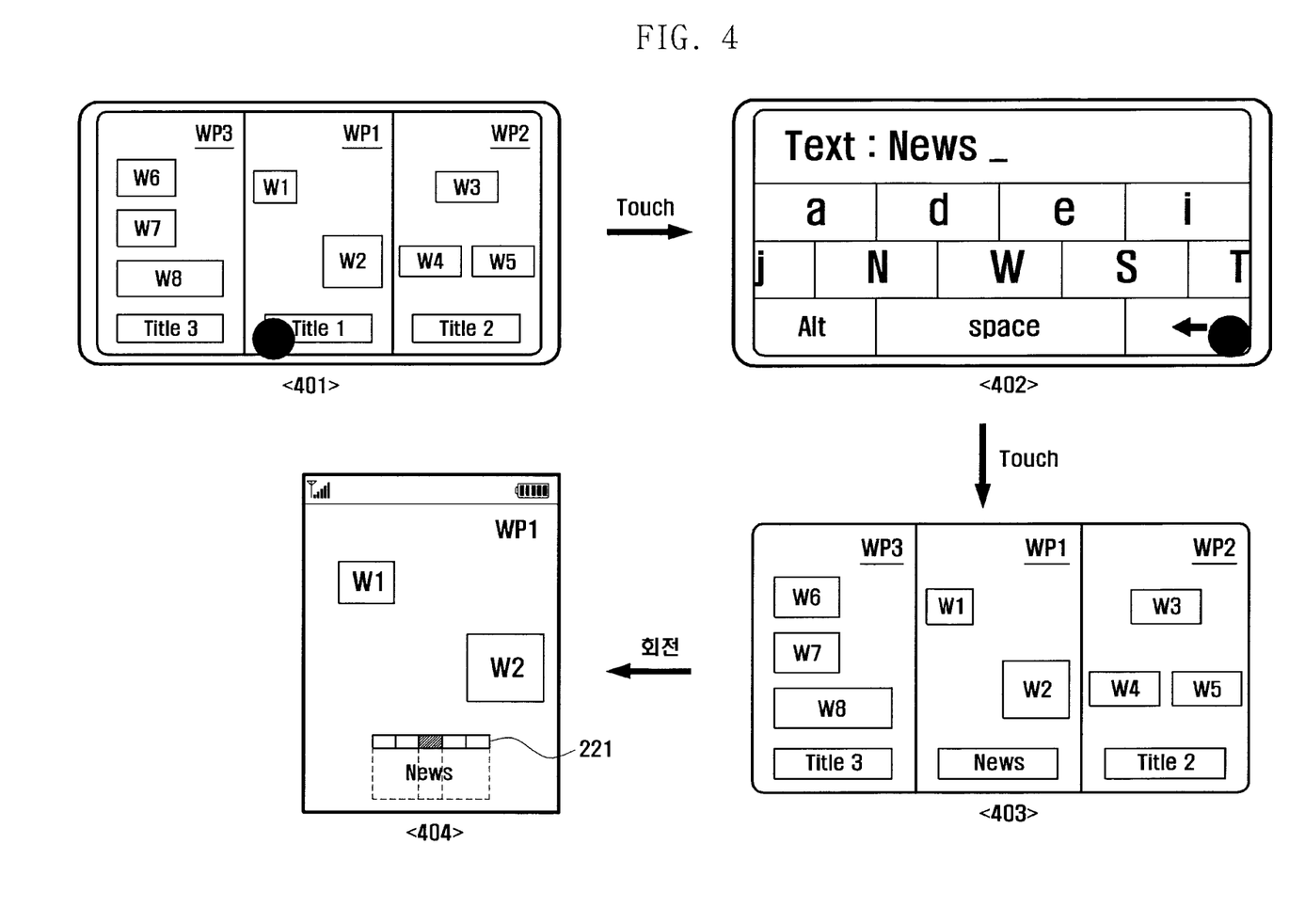
FIG. 4 is an exemplary view illustrating a process of editing a title of a page during the edit of a home screen for a mobile device in accordance with an exemplary embodiment of the present invention.

FIG. 4 is an exemplary view illustrating a process of editing a title of a page during the edit of a home screen for a mobile device in accordance with an exemplary embodiment of the present invention.

Referring to FIG. 4, when receiving a user's given input for activating a page edit screen, the mobile device outputs the page edit screen 401 having a plurality of pages. The mobile device may then adjust the size of each page in order to put several pages onto a single screen. Namely, as the page edit screen may be set to contain three, four or five pages, for example, each page is resized differently. Meanwhile, the mobile device may also output a title of each page at a certain part of each page. For example, the title may appear at a lower part of each page, as shown. If a user wants to modify a title of a specific page, he or she can invoke a touch event on a title region of a selected page.

The mobile device then activates a text editor used for the edit of a title, as shown in a screen indicated by a reference number 402. This text editor includes a key map region used for selecting alphabet letters or numbers and a display region used for outputting a selected word. When a user selects a specific key in the key map region, the mobile device outputs a particular alphabet letter or number assigned to the selected key in the display region. After a title edit is completed, a user can enter a proper key input such as pressing the OK key in the key map region. Then the mobile device applies a text inputted through the text editor as a title of a selected page. For instance, if a user selects a title of the first page WP1 and then makes a new title "News" through a title edit process as described above, the title of the first page WP1 is changed from "Title 1" to "News" as shown.

Additionally, the mobile device may receive an input signal, such as a touch event or motion signal, for shifting the page edit screen 403 to a page search screen 404. Then the mobile device outputs the first page WP1 centrally disposed on the page edit screen 403 as a full screen 404. Here, the mobile device further outputs the first and second widget icons W1 and W2 in the first page WP1, and may also output the location bar 221 indicating the total number of pages and a relative location of the first page WP1. In addition, the mobile device may output a title "News" of the first page WP1 near the location bar 221

Meanwhile, when receiving an input signal, such as a navigation key signal or its equivalent for a search of another page, the mobile device changes a currently displayed page, a page indication in the location bar 221, and a title of a displayed page. For instance, if a user invokes a touch event containing a leftward sweep on the display unit formed of a touch screen, the mobile device removes the first page WP1 from the display unit and instead outputs the second page WP2 on the screen 404. Here, the mobile device indicates a relative location of the second page WP2 in the location bar 221 and also outputs a title "Title 2" of the second page WP2 in the title region.

Figure 5:
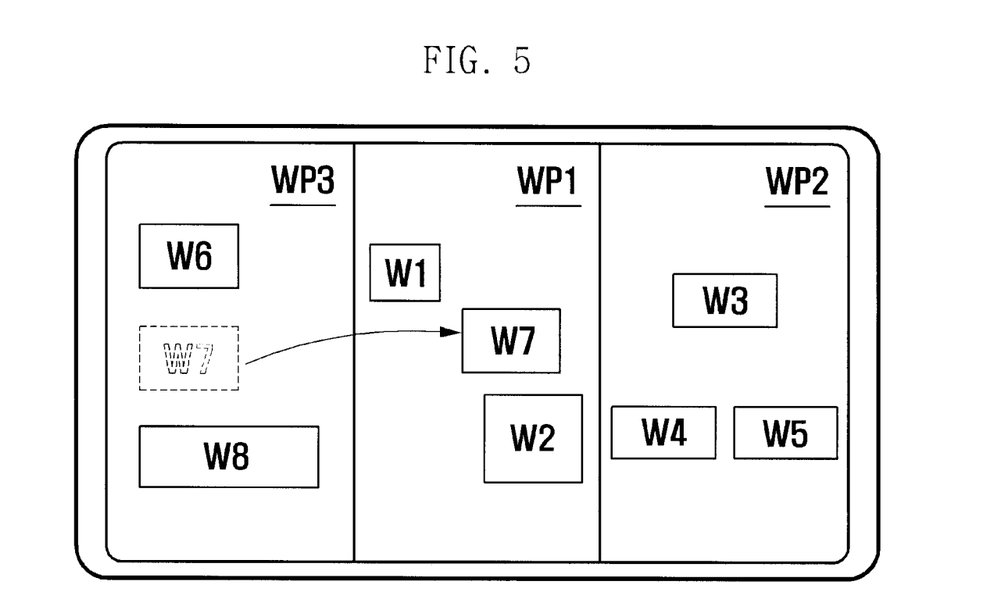
FIG. 5 is an exemplary view illustrating a process of editing a widget icon in a page during the edit of a home screen for a mobile device in accordance with an exemplary embodiment of the present invention.

FIG. 5 is an exemplary view illustrating a process of editing a widget icon in a page during the edit of a home screen for a mobile device in accordance with an exemplary embodiment of the present invention.

Referring to FIG. 5, the mobile device outputs three pages arranged in a widthwise mode on the display unit. Here, the first page WP1 contains the first and second widget icons W1 and W2, and the second page WP2 contains the third, fourth and fifth widget icons W3, W4 and W5, respectively. Also, the third page WP3 contains the sixth, seventh and eighth widget icons W6, W7 and W8, respectively.

A user may want to change the location of a specific widget icon. For instance, a user may desire to move the seventh widget icon W7 in the third page WP3 to the first page WP1. In this case, a user touches the seventh widget icon W7 in the third page WP3 and then drags it to a desired position in the first page WP1. Then the mobile device moves the seventh widget icon W7 from the third page WP3 to the first page WP1, while expressing the movement of the seventh widget icon W7 in a visual manner. In the end, the first page WP1 comes to have the seventh widget icon W7 as well as the first and second widget icons W1 and W2.

On the other hand, a user may want to delete a specific widget icon rather than move it to other page. In this case, a user may touch a desired widget icon to be deleted and then drag it in any direction except a direction toward other pages. For instance, if a widget icon is in the first page WP1, a user may take a touch and drag action in an upward or downward direction. Alternatively, a flick action may be used instead of a touch and drag action. When such an input event occurs, the mobile device removes a selected widget icon from its page. At this time, the mobile device may output a popup window for inquiring about a widget icon deletion in order to prevent unintended deletion due to a mistaken touch.

Figure 6:
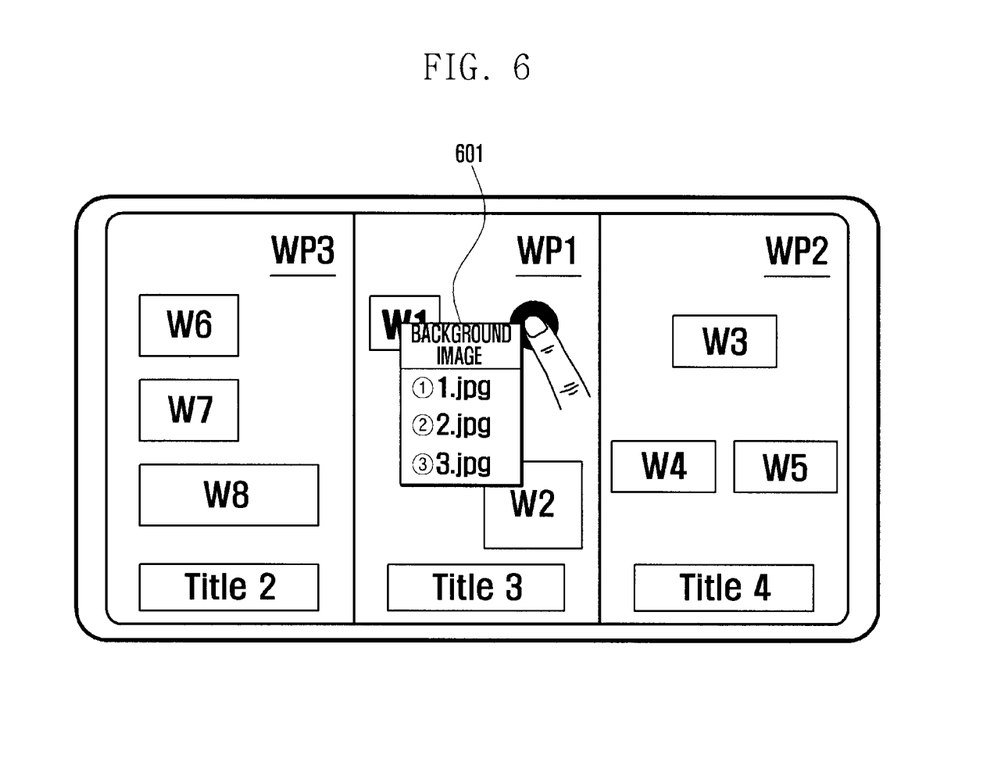
FIG. 6 is an exemplary view illustrating a process of editing a background image of a page during the edit of a home screen for a mobile device in accordance with an exemplary embodiment of the present invention.

FIG. 6 is an exemplary view illustrating a process of editing a background image of a page during the edit of a home screen for a mobile device in accordance with an exemplary embodiment of the present invention.

Referring to FIG. 6, the mobile device outputs three pages arranged in a widthwise mode on the display unit. Here, the first page WP1 contains the first and second widget icons W1 and W2, and the second page WP2 contains the third, fourth and fifth widget icons W3, W4 and W5. Also, the third page WP3 contains the sixth, seventh and eighth widget icons W6, W7 and W8, as previously described.

A user may change a background image of each page. For this, a user may invoke an input event, such as a touch event, for example that may be either a long press or a double tap, on a desired page. When receiving the input event for changing a background image from a specific page, the mobile device launches a window 601 for setting a background image. This setting window 601 outputs a list of at least one background image. For instance, the setting window 601 has a list of three background images "1.jpg, 2.jpg, and 3.jpg". When a user selects one of the listed three background images, the mobile device receives a selection signal and then applies a selected background image to a desired page. Alternatively, the setting window 601 may support a search for background images instead of outputting a list of image file names. In this case, a user can check respective background images and then select one of them.

Meanwhile, the mobile device may allow a simultaneous change in background images of all pages, depending on the input received. For instance, when a user invokes a touch event at one of boundaries between pages, the mobile device regards such a touch event as instructions to change background images of all pages.

Figure 7:
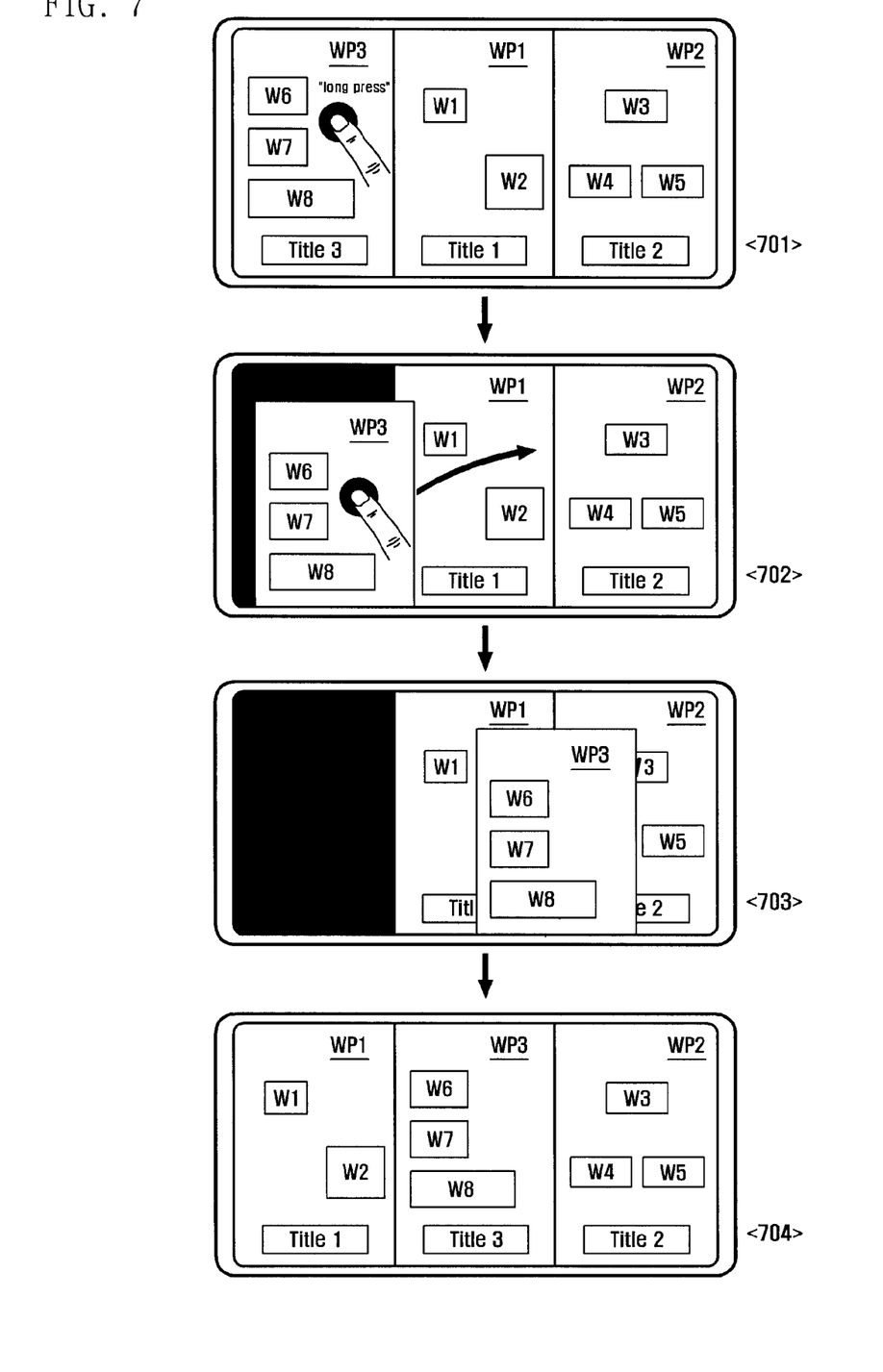
FIG. 7 is an exemplary view illustrating a process of changing the order of pages during the edit of a home screen for a mobile device in accordance with an exemplary embodiment of the present invention.

FIG. 7 is an exemplary view illustrating a process of changing the order of pages during the edit of a home screen for a mobile device in accordance with an exemplary embodiment of the present invention.

Referring to FIG. 7, a user may select a specific page to be changed in positional order as shown in a screen indicated by a reference number 701. For instance, a user who wants to add third page WP3 between the first and second pages WP1 and WP2 invokes an input event on the third page WP3. The input event for changing the order of pages may be a touch event that represents a long press, for example. When receiving an input signal of a long press from any region not occupied by widget icons in the third page WP3, the mobile device regards such an input signal as instructions to change a positional order of the third page WP3. Then the mobile device offers a visual feedback which tells the user that the third page WP3 is selected and movable, as shown in a screen 702. Namely, the mobile device varies an image of the third page WP3 as if it floats and moves on the screen 702.

Thereafter, a user drags the third page WP3 with along the movement of the touched event toward a boundary between the first and second pages WP1 and WP2. Then, depending on the direction, speed and distance of a user's drag, the mobile device moves the third page WP3 while overlapping with the first and second pages WP1 and WP2. At this time, a region absent from the third page WP3 becomes exposed, as shown in screens 702 and 703. This exposed region may be represented by a given color or image.

After the drag event has completed, a user invokes a touch event, such as a touch release, from the third page WP3 near a boundary between the first and second pages WP1 and WP2. Then the mobile device regards such a touch event as instructions to add the third page WP3 between the first and second pages WP1 and WP2. Finally, as shown in a screen 704, the mobile device moves the first page WP1 to the exposed region and also disposes the third page WP3 a central region absent from the first page WP1.

As discussed, according to an embodiment of the invention, a change in the positional order of pages is performed through a user's selection and drag action for a specific page on the page edit screen having at least one page.

Although the above-discussed examples are cases where pages used for the home screen have widget icons, this is exemplary only and not to be considered as a limitation of the present invention. Alternatively, such pages for the home screen may have menu icons or similar features, in addition to, or instead of, widget icons. The above-discussed examples may be equally applied to alternative cases where pages for the home screen have menu icons or the like.

Figure 8:
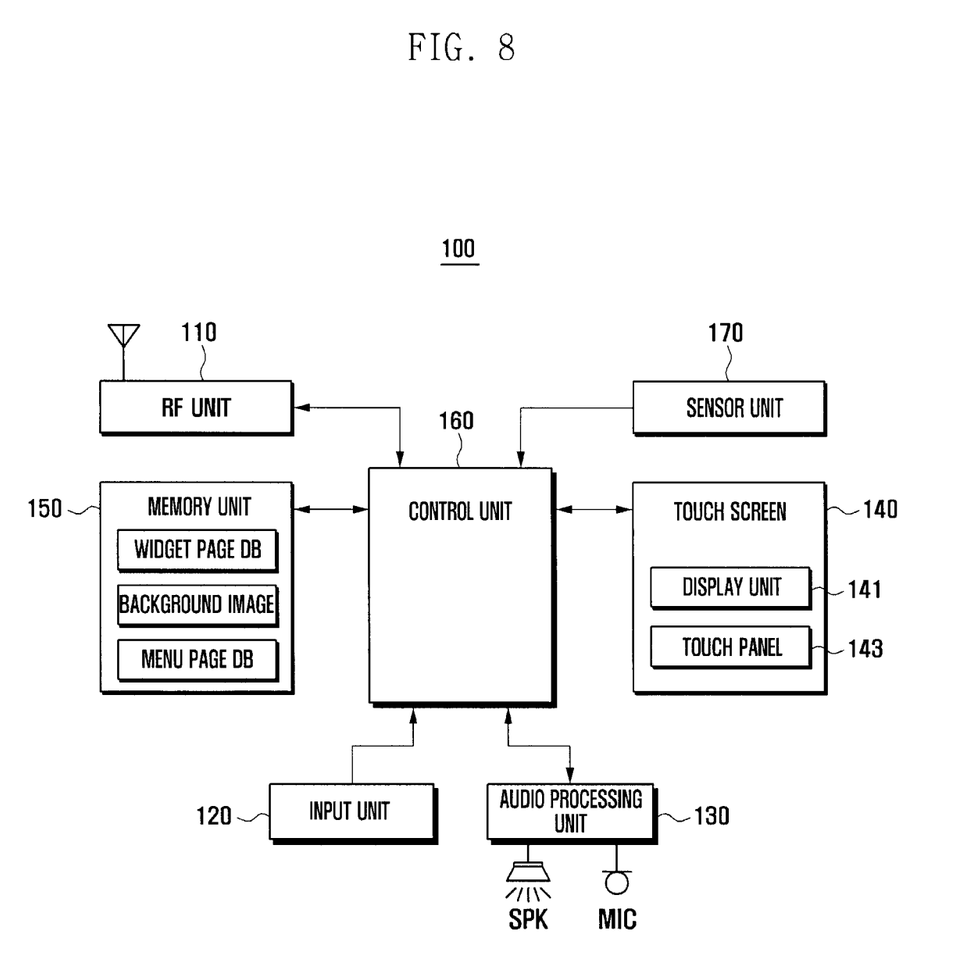
FIG. 8 is a block diagram which illustrates a configuration of a mobile device allowing the edit of a home screen in accordance with an exemplary embodiment of the present invention.

FIG. 8 is a block diagram which illustrates a configuration of a mobile device allowing for the edit of a home screen in accordance with an exemplary embodiment of the present invention.

Referring to FIG. 8, the mobile device 100 includes a radio frequency (RF) unit 110, an input unit 120, an audio processing unit 130, a touch screen 140, a memory unit 150, a sensor unit 170, and a control unit 160. Here, the input unit 120, the touch screen 140 and the sensor unit 170 may form together an input signal creation module, which creates input signals for the activation of a page edit screen and for the edit of pages in the page edit screen at a user's request.

The mobile device 100 having the above elements offers the page edit screen in which pages used for the home screen are edited, depending on a given input signal created by the input unit 120, the touch screen 140 and the sensor unit 170. Specifically, the mobile device 100 provides several functions of adding a new page, deleting a selected page, changing a title of a selected page, moving or removing a selected icon in a page, changing a background image of a selected page, changing a positional order of pages, and the like through the page edit screen. Additionally, input signals include a particular key input signal created by the input unit 120, a particular touch event occurring on the touch screen 140, and a particular motion sensing signal generated by the sensor unit 170. Now, each element of the mobile device will be described in detail.

The RF unit 110 establishes necessary communication channels under the control of the control unit 160. Namely, the RF unit 110 may form one or more of a voice call channel, a video call channel, a short message service (SMS) channel, a multimedia message service (MMS) channel, a data communication channel, and the like. The RF unit 110 may include an RF transmitter that upwardly converts the frequency of signals to be transmitted and amplifies the signals, and an RF receiver which amplifies received signals and downwardly converts the frequency of the received signals. The RF unit 100 may be selected according to a touch event created by a touch panel 143 under the control of the control unit 160. Particularly, the RF unit 110 according to an embodiment of this invention may be activated depending on a request through a menu icon or a widget icon arranged in at least one of pages forming the home screen.

The input unit 120 includes a plurality of normal input keys and special function keys (not shown) which are configured to receive user's instructions. The function keys may have navigation keys, side keys, shortcut keys, and any other special keys. The input unit 120 creates various key signals in association with user's instructions and delivers them to the control unit 160. The input unit 120 may be formed of a QWERTY keypad, a 3*4 keypad, a 4*3 keypad, etc. each of which has a plurality of keys. In some embodiment, the input unit 120 may be omitted and replaced with the touch screen 140 if the touch screen 140 is made in the form of a full touch screen. Particularly, the input unit 120 according to an embodiment of this invention may create a particular input signal for editing at least one page for the home screen, and may also have a hot key specialized for the page edit screen.

The audio processing unit 130 has a speaker (SPK) for outputting audio signals and a microphone (MIC) for receiving audio signals. Particularly, the audio processing unit 130 according to an embodiment of this invention may output a specific audio signal associated with a shift of screens through the speaker (SPK) when an input signal for shifting a screen from a page search screen to a page edit screen is created. Additionally or alternatively, the mobile device may generate a specific vibration pattern associated with a shift of screens.

The touch screen 140 includes a display unit 141 and a touch panel 143. Typically the touch panel 143 is disposed at the front of the display unit 141. The size of the touch screen 140 may depend on that of the touch panel 143.

The display unit 141 represents a variety of information on a screen in association with the operation of the mobile device 100. For instance, the display unit 141 may offer various screens such as a home screen, a menu screen, a call screen, a message screen, etc. Particularly, the display unit 141 according to an embodiment of this invention may output at least one page on the home screen. Such a page may include a widget page containing at least one widget icon set by a user and a menu page containing at least one menu icon set by a user. The display unit 141 may be formed of a liquid crystal display (LCD), an organic light emitting device (OLED), or any other equivalents.

The touch panel 143 is configured to cover the display unit 141. The touch panel 143 creates a touch event according to the touch or proximity of an object such as a user's finger and then delivers a created touch event to the control unit 160. The touch panel 143 may be composed of touch sensors arranged in the form of matrix. With regard to a specific touch event, the touch panel 143 sends information about a location and a type of a touch event to the control unit 160. Types of a touch event may include a touchdown event which occurs by a contact on the touch panel, a touchup, or touch release, event which occurs by a release of a contact from the touch panel, a touch drag or touch move event which occurs by a movement of a contact on the touch panel, a flick event which occurs by a quick and accelerated movement of a contact, a long press event which occurs by a continued contact for a given time, and the like. The control unit 160 checks information about the location and type of a touch event delivered from the touch panel 143. Then the control unit 160 checks a displayed image mapped with the location of a touch event and activates a particular function linked to the displayed image. Particularly, the touch panel 143 according to an embodiment of this invention may create a touch event for a shift to and from the page edit screen. For this, the mobile device 100 may output a key map for such a shift of the page edit screen.

The memory unit 150 stores a variety of applications and data required for the operation of the mobile device 100, including a key map or a menu map for the operation of the touch screen 140. Here, such a key map or a menu map may be provided in various forms. Namely, the key map may be a keyboard map, a 3*4 key map, a QWERTY key map, or the like. Additionally, the key map may be a control key map suitable for the operation of a currently activated application. Also, the menu map may be a specific menu map suitable for the operation of a currently activated application or another menu map having various menu items used for the mobile device. The memory unit 150 may consist of a program region and a data region.

The program region may store an operating system (OS) for booting the mobile device 100 and for operating the aforesaid elements, an application for supporting a call function, a web browser for supporting access to an internet server, a music play application, an image display application, a video play application, and the like. Particularly, the program region according to an embodiment of this invention may store a routine for outputting a specific page on the home screen, a routine for outputting the page edit screen used for editing at least one page in response to a given input signal, a routine for supporting a change in a title of a selected page, a routine for supporting a movement of a selected icon in a page, a routine for supporting a change in a positional order of pages, a routine for supporting an addition or deletion of a page, a routine for supporting a change in a background image of a selected page, and the like. Each of the above routines may be activated in response to a proper input signal.

The data region stores data created while the mobile device 100 is used. Specifically, the data region may store phonebook data, at least one icon associated with a widget function, and various contents. Additionally, the data region may store a user's input entered through the touch screen 140. Particularly, the data region according to an embodiment of this invention may store widget page database, menu page database, background images, and the like. The widget page database and menu page database may be varied according to an addition or deletion of pages or a change of icons between pages.

The sensor unit 170 includes various kinds of sensors such as an acceleration sensor, a gyro sensor, a pressure sensor, a vibration sensor, a geometric sensor, a photo sensor, or the like. These sensors operate when an electric power is supplied under the control of the control unit 160, and also generate a particular motion signal in response to the movement of the mobile device, the pressure applied to the mobile device, or the like. If the sensor unit 170 may be formed of acceleration sensors for example, the sensor unit 170 detects variation of acceleration in lengthwise and widthwise modes and then sends a detection signal to the control unit 160.

The control unit 160 performs an overall control function related to the mobile device and controls the flow of signals between elements in the mobile device. The control unit 160 may support a page edit screen in response to a given input signal offered from at least one of the input unit 120, the touch screen 140 and the sensor unit 170. Namely, the control unit 160 outputs the page edit screen used for editing at least one page, depending on an input signal from the input signal creation module. Additionally, when receiving additional input signals on the page edit screen, the control unit 160 performs a function to add a new page, a function to delete a selected page, a function to change a title of a selected page, a function to move or remove a selected icon in a page, a function to change a background image of a selected page, and a function to change a positional order of pages, being based on routines stored in the program region.

Meanwhile, the control unit 160 may check a sensor signal delivered from the sensor unit 170 and then control page edit functions depending on such a sensor signal. For instance, if an acceleration sensor is equipped, the mobile device may detect a signal generated by its motion such as a swing or snap. Here, the control unit 160 may distinguish a swing from a snap through variation of frequency. Namely, when a variation curve of frequency amplitude is slow and occurs several times, the control unit 160 regards a motion of the mobile device as a swing. However, when a variation curve of frequency amplitude is sharp and occurs once, the control unit 160 regards a motion of the mobile device as a snap. In another embodiment, the control unit 160 may use a gyro sensor and detect a signal caused by variations of direction, gradient, etc. of the mobile device 100. In still another embodiment, the control unit 160 may use a vibration sensor and detect a signal caused by a swing of the mobile device or external shocks. Therefore, the control unit 160 can control various operations of the mobile device 100, especially a shift of the page edit screen, depending on signals detected by the sensor unit 170.

The above-described methods according to the present invention, under the control of the controller, can be realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software using a general purpose computer, or a special processor or in programmable or dedicated hardware, such as an ASIC or FPGA. As would be understood in the art, the controller, the computer, the processor or the programmable hardware include memory components, e.g., RAM, ROM, Flash, etc. that may store or receive software or computer code that when accessed and executed by the controller, computer, processor or hardware implement the processing methods described herein. The code when loaded into a general purpose computer transformed the general purpose computer into a special purpose computer that may in part be dedicated to the processing shown herein. In addition, the computer, processor or dedicated hardware may be composed of at least one of a single processor, a multi-processor, and a multi-core processor.

As discussed hereinbefore, functions related to a page edit for the home screen in the mobile device according to embodiments of this invention may include a function to output a page edit screen, a function to add a new page, a function to delete a selected page, a function to change a title of a selected page, a function to move or remove a selected icon in a page, a function to change a background image of a selected page, and a function to change a positional order of pages.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for editing a home screen set in an electronic device having a display, the home screen set comprised of a plurality of home screen pages, each home screen page used to display at least one icon, the method comprising:

displaying a first home screen page of the home screen pages, as at least part of a home screen, at a first size on the display;

in response to detecting a predetermined user input for editing, displaying an edit screen comprising all of the home screen pages of the home screen set, with each of the home screen pages being fully displayed but at a reduced size relative to the first size;

detecting a first user input for selecting one of the plurality of the displayed home screen pages; and in response to a second user input, moving the selected home screen page to modify a sequence of the displayed home screen pages, while maintaining the same home screen pages of the home screen set.

2. The method of claim 1, wherein the predetermined user input for editing is at least one of:
a key input to an input unit;
a touch input on a touch screen; and
a motion detected by a sensor unit.

3. The method of claim 2, wherein the predetermined input for editing is the motion detected by the sensor unit, the sensor unit detects the motion by detecting a first variation of gradient caused by a change of a lengthwise mode to a widthwise mode; and the sensor unit generates a motion signal depending on the first variation of gradient.

4. The method of claim 3, further comprising:
detecting a second variation of gradient caused by a change of the widthwise mode to the lengthwise mode; and
returning to the home screen from the page edit screen in response to the second variation of gradient.

5. The method of claim 1, further comprising:
returning to the home screen in which a single one of the home screen pages is displayed, in response to a page return input signal; and
outputting a location bar in the single page on the home screen, the location bar indicating a relative sequence location of the single page in the home screen set.

6. The method of claim 5, further comprising:
outputting a title of the single page near the location bar in the single page on the home screen.

7. The method of claim 5, wherein the displaying of the edit screen includes:
disposing the one home screen page at the center of the edit screen; and
disposing the at least one other of the plurality of the displayed home screen pages near the one home screen page.

8. The method of claim 7, wherein the single page displayed upon the returning to the home screen is a page disposed at the center of the edit screen.

9. The method of claim 1, further comprising:
outputting a location bar on the edit screen, the location bar indicating a relative location of the plurality of the home screen pages displayed in the edit screen.

10. The method of claim 1, further comprising:
outputting a location bar on the edit screen, the location bar indicating a relative location of the plurality of the home screen pages displayed in the edit screen; and
adjusting an indication of a number of pages shown on the location bar in response to adding or deleting of pages in the home screen set based on a selection input signal.

11. The method of claim 1, further comprising:
outputting a title of each page;
outputting a key map in response to a title edit input signal; and
setting the title depending on keys selected in the key map.

12. The method of claim 1, further comprising:
receiving a background image change input signal for a change in a background image of the page;
outputting a window containing at least one background image;
receiving a selection of a specific one of the at least one background images; and
applying the selected specific background image to at least one of the plurality of the home screen pages displayed in the edit screen.

13. The method of claim 1, further comprising:
receiving a widget icon transfer input signal; and
transferring a selected widget icon from one page to another page.

14. The method of claim 1, wherein the first user input is a long-press touch input; and
wherein the second user input is a touch-drag input.

15. An electronic device comprising:
a display unit controlled to display, at different times, respective home screen pages of a home screen set at a first size, with each of the home screen pages being displayed as at least part of a home screen, and each home screen page used for displaying at least one icon; and
a control unit configured to:
detect a predetermined user input for editing, and in response, to display via the display unit an edit screen comprising all of the home screen pages of the home screen set, with each of the home pages being displayed at a reduced size relative to the first size;
detect a first user input for selecting one of the plurality of the displayed home screen pages; and
in response to a second user input, move the selected home screen page to modify a sequence of the displayed home screen pages, while maintaining the same home screen pages of the home screen set.

16. The electronic device of claim 15, further comprising an input signal creation module responsive to a received input signal corresponding to the predetermined user input, wherein the input signal creation module includes at least one of:
an input unit configured to create a particular key input signal corresponding to the predetermined user input;
a touch screen configured to create a particular touch event corresponding to the predetermined user input; and
a sensor unit configured to create a particular motion signal corresponding to the predetermined user input.

17. The electronic device of claim 15, wherein the control unit is further configured to:
output the edit screen containing the plurality of the displayed home screen pages in the display unit when a mode of the electronic device is changed from a lengthwise mode to a widthwise mode, and
return to the home screen from the edit screen when the mode of the electronic device is changed from the widthwise mode to the lengthwise mode.

18. The electronic device of claim 15, wherein the control unit is further configured to output at least one of:
a location bar indicating a relative location of a page displayed on the home screen or contained in the edit screen, the location bar being modified by an increase or decrease of a page caused by a page addition or deletion;
a title of the page displayed on the home screen or contained in the edit screen;
a window containing background images to be applied to the page displayed on the home screen or contained in the edit screen; and at least one icon contained in the page displayed on the home screen or contained in the edit screen.

* * * * *